United States Patent
Froeschl

(10) Patent No.: US 11,034,231 B2
(45) Date of Patent: Jun. 15, 2021

(54) HYBRID VEHICLE

(71) Applicant: Bayerische Motoren Werke Aktiengesellschaft, Munich (DE)

(72) Inventor: Joachim Froeschl, Herrsching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 153 days.

(21) Appl. No.: 16/369,622

(22) Filed: Mar. 29, 2019

(65) Prior Publication Data

US 2019/0225072 A1 Jul. 25, 2019

Related U.S. Application Data

(63) Continuation of application No. PCT/EP2017/079829, filed on Nov. 21, 2017.

(30) Foreign Application Priority Data

Dec. 6, 2016 (DE) ...................... 10 2016 224 199.0

(51) Int. Cl.
*B60K 6/52* (2007.10)
*B60K 6/448* (2007.10)
*B60W 30/18* (2012.01)
*B60W 20/14* (2016.01)
*B60K 7/00* (2006.01)

(52) U.S. Cl.
CPC ................ *B60K 6/448* (2013.01); *B60K 6/52* (2013.01); *B60W 20/14* (2016.01); *B60W 30/18145* (2013.01); *B60K 2007/0092* (2013.01); *B60W 2720/406* (2013.01); *Y02T 10/62* (2013.01)

(58) Field of Classification Search
CPC ................ B60K 1/02; B60K 2001/001; B60K 2006/266; B60K 6/52; B60K 2007/0092; B60K 17/356; B60W 20/14
See application file for complete search history.

(56) References Cited

U.S. PATENT DOCUMENTS 4,042,056 A 8/1977 Horwinski
6,008,606 A * 12/1999 Arai ...................... B60W 10/02
318/431

(Continued)

FOREIGN PATENT DOCUMENTS

DE 101 48 113 A1 4/2003
DE 10 2009 008 324 A1 8/2010

(Continued)

OTHER PUBLICATIONS

International Search Report (PCT/ISA/210) issued in PCT Application No. PCT/EP2017/079829 dated Jan. 26, 2018 with English translation (five (5) pages).

(Continued)

*Primary Examiner* — Jeffrey J Restifo
(74) *Attorney, Agent, or Firm* — Crowell & Moring LLP

(57) ABSTRACT

A hybrid vehicle has an internal combustion engine, at least two electric motors, at least four wheels, a first axle and at least a second axle. Two of the wheels are associated with each axle. The internal combustion engine is provided for driving the wheels of the first axle, and the two electric motors are provided for driving respective wheels of the second axle.

12 Claims, 2 Drawing Sheets

(56) References Cited

U.S. PATENT DOCUMENTS

| | | | | |
|---|---|---|---|---|
| 6,321,865 B1* | 11/2001 | Kuribayashi | ............ | F16H 3/72 180/243 |
| 9,139,195 B2* | 9/2015 | Noguchi | ................. | B60K 6/52 |
| 9,150,118 B2* | 10/2015 | Shinohara | ............ | B60K 7/0007 |
| 9,511,682 B2 | 12/2016 | Ando | ..................... | B60K 6/52 |
| 9,630,486 B2* | 4/2017 | Yamada | ............. | B60K 7/0007 |
| 9,694,819 B2* | 7/2017 | Honda | ..................... | B62D 6/00 |
| 9,908,434 B2* | 3/2018 | Konishi | .............. | B60K 7/0007 |
| 9,945,446 B2* | 4/2018 | Hiramatsu | ............... | B60K 6/54 |
| 9,969,400 B2* | 5/2018 | Sakaguchi | ............ | B60W 20/10 |
| 10,040,441 B2* | 8/2018 | Fuchtner | ................. | B60K 6/44 |
| 10,059,199 B2* | 8/2018 | Jeong | ...................... | B60K 1/02 |
| 10,112,602 B2* | 10/2018 | Hiramatsu | ............... | B60K 6/52 |
| 10,160,328 B2* | 12/2018 | Uneme | .................... | B60L 50/16 |
| 10,300,910 B2* | 5/2019 | Jeong | ................... | B60W 10/115 |
| 10,336,337 B2* | 7/2019 | Sakaguchi | ........... | B60K 17/046 |
| 10,442,282 B2* | 10/2019 | Shinohara | ................. | B60L 7/26 |
| 10,486,521 B2* | 11/2019 | Haka | ....................... | B60K 6/387 |
| 10,654,483 B2 | 5/2020 | Nasu | ....................... | B60K 1/02 |
| 10,710,462 B2* | 7/2020 | Yamaguchi | .......... | B60K 17/046 |
| 10,781,890 B2* | 9/2020 | Lian | ..................... | B60K 7/0007 |
| 10,807,466 B1* | 10/2020 | Haka | ...................... | B60K 17/22 |
| 2003/0082424 A1 | 5/2003 | Kohrs et al. | | |
| 2004/0200654 A1* | 10/2004 | Hatsuda | ................... | B60K 6/52 180/243 |
| 2007/0102209 A1 | 5/2007 | Doebereiner | | |
| 2009/0088914 A1* | 4/2009 | Mizutani | ............. | B60W 10/119 701/22 |
| 2013/0133961 A1 | 5/2013 | Matsuda et al. | | |
| 2013/0261863 A1* | 10/2013 | Noguchi | ............... | B60W 20/00 701/22 |
| 2015/0065293 A1* | 3/2015 | Ando | ................... | B60K 7/0007 477/1 |

FOREIGN PATENT DOCUMENTS

| | | |
|---|---|---|
| DE | 10 2012 220 074 A1 | 5/2013 |
| DE | 10 2013 205 505 A1 | 10/2013 |
| DE | 11 2013 001 795 T5 | 12/2014 |
| DE | 10 2015 004 119 A1 | 10/2016 |
| EP | 1 747 929 A1 | 1/2007 |

OTHER PUBLICATIONS

German-language Written Opinion (PCT/ISA/237) issued in PCT Application No. PCT/EP2017/079829 dated Jan. 26, 2018 (six (6) pages).

German Search Report issued in counterpart German Application No. 10 2016 224 199.0 dated Aug. 31, 2017 with partial English translation (10 pages).

* cited by examiner

HYBRID VEHICLE

CROSS REFERENCE TO RELATED APPLICATIONS

This application is a continuation of PCT International Application No. PCT/EP2017/079829, filed Nov. 21, 2017, which claims priority under 35 U.S.C. § 119 from German Patent Application No. 10 2016 224 199.0, filed Dec. 6, 2016, the entire disclosures of which are herein expressly incorporated by reference.

BACKGROUND AND SUMMARY OF THE INVENTION

The invention relates to a hybrid vehicle with an internal combustion engine, an electric motor and at least four wheels.

Hybrid vehicles which use both an internal combustion engine and an electric motor drive are well known.

In so-called serial hybrid vehicles, an internal combustion engine drives a generator which provides electric power for an electric motor. This electric motor in turn drives the wheels of the vehicle. This approach is not particularly efficient since the series connection of internal combustion engine and electric motor means that only reduced efficiency levels of the entire system can be achieved.

In other hybrid vehicles, one axle of the hybrid vehicle is driven by the internal combustion engine and the other axle is driven by an electric motor. The electric motor here also serves for recuperation of kinetic energy on braking. This approach only makes limited use of the existing recuperation potential since energy can only be recovered on braking.

It is therefore an object of the invention to provide a hybrid vehicle which offers both efficient drive and extensive recuperation possibilities.

This and other objects are achieved with a hybrid vehicle having an internal combustion engine, at least two electric motors, at least four wheels, a first axle and at least a second axle, wherein two of the wheels are assigned to each axle. The internal combustion engine is provided for driving the wheels of the first axle, and each electric motor is provided for driving a respective one of the two wheels of the second axle.

The term "axle" here also refers to a pair of opposing wheels which are attached to the vehicle by means of individual wheel suspension. The term also covers pairs of wheels as commonly found, for example, on commercial vehicles. The internal combustion engine may be connected rotationally fixedly to the wheels of the first axle in the known fashion, for example via a gear mechanism and/or a clutch, in order to be able to transmit the generated torque to the wheels of the first axle. The electric motors may also drive the wheels of the second axle via a gear mechanism and/or a clutch.

Because the wheels are operated directly by the internal combustion engine or individually by the electric motors, a very efficient drive is made possible with low losses since the electrical energy is converted directly into kinetic energy.

At the same time, the number of driving situations in which kinetic energy can be recuperated into electrical energy is increased.

As well as the known recuperation possibilities on braking, according to the invention, for example, energy can be recovered during steering. For this, the electric motor assigned to the wheel of the second axle on the inside of the corner is operated as a generator so that only this wheel is braked. This creates a steering moment on the second axle, i.e. a torque about the vehicle vertical axis, which leads to a rotational movement of the vehicle. In this way, electrical energy can be produced during steering, whereas steering usually costs energy.

Similarly, an intervention of an automatic stability program of the vehicle (DSC, ESP etc.) may be carried out by briefly operating one of the individual electric motors as a generator, whereby here again energy can be recovered.

Also, driving safety is increased by the individual electric motors since all-wheel start-up support can be optimized, and improvements for hill starts or when descending a gradient are possible due to individual actuation of the wheels of the second axle.

The first axle may be the front axle of the vehicle and the second axle may be the rear axle of the vehicle or vice versa. If the electric motors are provided on the front axle, the efficiency of recuperation may be increased further, whereas electric motors on the rear axle can be integrated more easily into existing drive concepts.

Preferably, the vehicle has an on-board power network and consumers which are electrically connected to the on-board power network, wherein the electric motors are electrically connected to the on-board power network. Here, the electric motors can feed power into the on-board power network and extract it therefrom, and thereby increase the reliability of supply for the consumers and the maximal power of the on-board power network. The on-board power network is operated for example with a voltage of 48 Volts.

Also, the internal combustion engine may have a generator which can feed power into the on-board power network, whereby a basic supply of power to consumers is guaranteed on operation of the internal combustion engine. In the case that the generator is a starter-generator, it may also extract power from the on-board power network.

In one embodiment of the invention, the on-board power network has two parallel cable harnesses which each extend from a power supply of the internal combustion engine to a respective one of the electric motors. The consumers are here electrically connected to one of the cable harnesses or to both cable harnesses. In this way, security against failure can be increased further. Also, the braking moments of the individual electric motors can easily be adjusted in that individual consumers can be connected to or disconnected from the respective assigned cable harness.

In a further embodiment of the invention, the electric motors can be directly coupled together mechanically and/or electrically. Mechanical coupling serves for torque transmission between the two electric motors.

The electric motors may also be coupled together without using the on-board power network. In this way, emergency running functions can be implemented, since the vehicle may remain maneuverable to a certain extent even if, for example, the steering or the on-board power network has failed.

For example, the electric motors may be coupled together mechanically by way of a shaft, a clutch and a differential gear mechanism, whereby an emergency running system can be reliably implemented.

An efficient and weight-saving coupling can be achieved in that the electric motors may be coupled together by direct cabling using a switch. When the switch is closed, one of the electric motors acts as a generator and produces power for the other, which may be operated as a motor. In this way, opposing torques occur at the wheels, whereby again a steering moment results.

For example, the hybrid vehicle has at least two electric motor accumulators, each of which is electrically connected to a respective electric motor, wherein individual cells of the electric motor accumulators, groups of cells or the entire electric motor accumulators may be coupled by means of a switch. The coupled cells, groups or accumulators then function as a unit for both electric motors. The switch may be a semiconductor switch or a contactor. In this way, an electrical coupling can be implemented without great cost.

Preferably, the vehicle has at least one on-board accumulator which is electrically connected to the on-board power network, so that the consumers can also be supplied with power independently of operation of the internal combustion engine or the electric motors.

In order to save weight and components, the two electric motor accumulators may be part of a divided accumulator and/or form the at least one on-board accumulator.

In one embodiment of the invention, the hybrid vehicle may have a control unit which is configured to control the electric motors such that, for recuperation on steering maneuvers, the electric motor of the wheel on the inside of the corner is operated as a generator in order to produce a steering moment. In this way, energy can be recovered during a steering maneuver, for example on lane change. The steering moment produced by operation as a generator may be generated both to support a conventionally produced steering moment or also as the sole steering moment of a steering maneuver.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
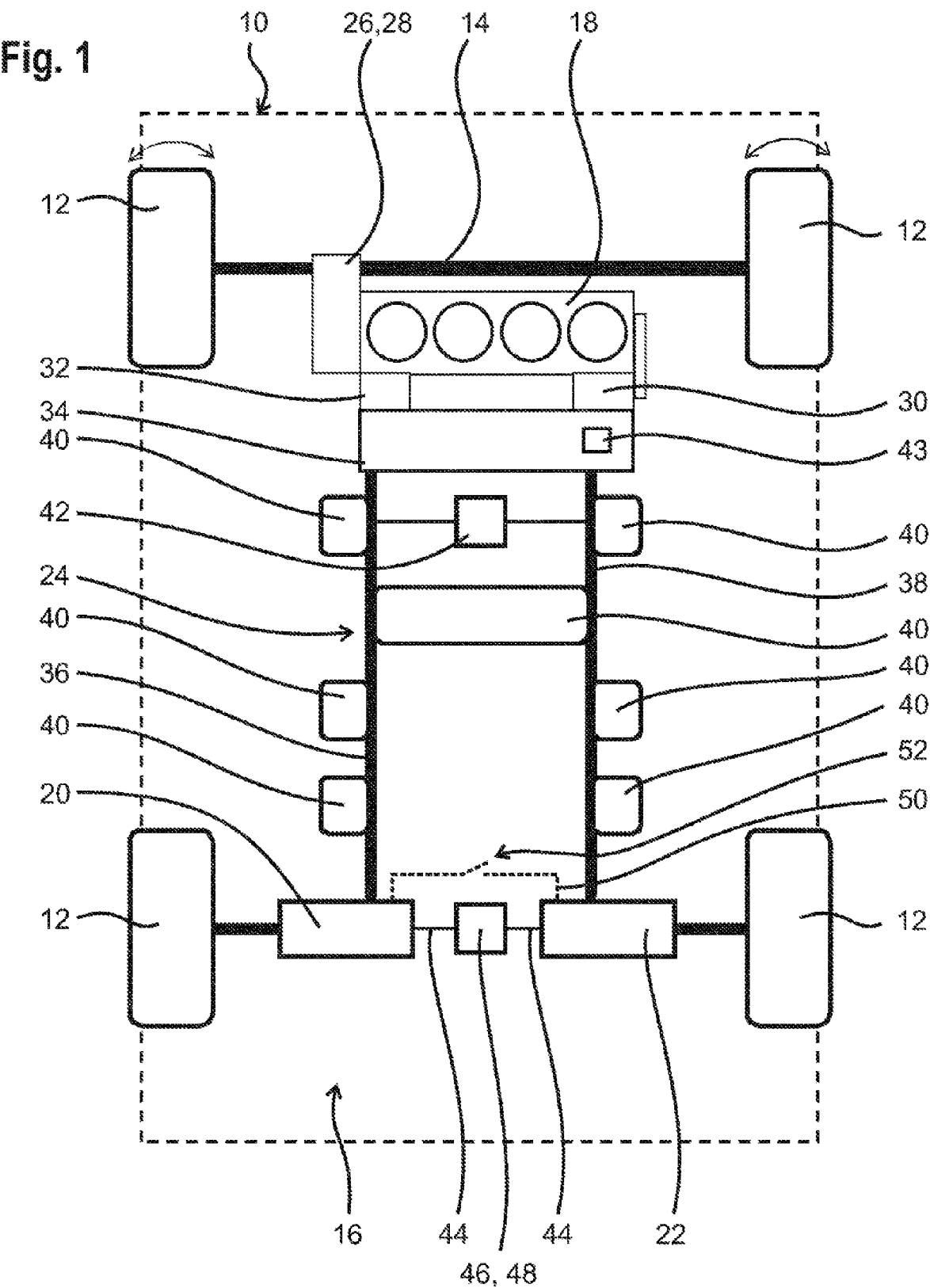
FIG. 1 is schematic diagram of a first embodiment of a hybrid vehicle according to the invention.

FIG. 1 shows diagrammatically a hybrid vehicle 10 as a dotted rectangle.

The hybrid vehicle 10 has four wheels 12, two of which are arranged on a first axle 14 and the other two on a second axle 16.

The wheels 12, in particular those of the second axle 16, may be attached to the hybrid vehicle 10 by way of individual wheel suspension.

In the embodiment shown, the first axle 14 is the front axle of the hybrid vehicle 10, and the second axle 16 is the rear axle of the hybrid vehicle 10. Thus the wheels 12 of the first axle 14 may be operated conventionally by a steering mechanism (not shown). This is indicated by the double arrows in the figures.

Alternatively, it is also contemplated that the second axle 16 is the front axle of the hybrid vehicle 10, and the first axle 14 is the rear axle of the hybrid vehicle 10.

The hybrid vehicle 10 also has an internal combustion engine 18, two electric motors 20, 22, and an on-board power network 24.

The internal combustion engine 18, or more precisely the output shaft (not shown) of the internal combustion engine 18, is connected to the first axle 14 by means of a gear mechanism 26 and a clutch 28. The internal combustion engine 18 may therefore drive the wheels 12 of the first axle 14 in the known fashion.

Also, the internal combustion engine 18 has an electric generator 30, a starter 32 and a power supply 34. The generator 30 and the starter 32 are connected to the power supply 34, which in turn is integrated in the on-board power network 24. The generator 30 may feed power into the on-board power network 24, and the starter 32 may extract power from the on-board power network 24.

It is also contemplated that the generator 30 and the starter 32 are configured as a starter-generator.

The electric motors 20, 22 are provided on the second axle 16. Each of the electric motors 20, 22 is connected to a respective one of the wheels 12 of the second axle 16 and can drive its assigned wheel 12. Here again, a gear mechanism and/or a clutch (not shown) may be provided between the electric motors 20, 22 and the assigned wheels 12.

In the embodiment shown, the left electric motor 20 is connected to the left wheel 12 of the second axle 16, and the right electric motor 22 is connected to the right wheel 12 of the second axle 16.

The electric motors 20, 22 are also electrically connected to the on-board power network 24 and can feed power into the on-board power network 24 and extract it therefrom. The on-board power network 24 is operated for example with a voltage of 48 Volts.

The on-board power network 24 has two parallel cable harnesses 36, 38 which each extend from the power supply 34 to a respective one of the electric motors 20, 22.

The cable harnesses 36, 38 run separately from each other, wherein they are electrically connected by means of the power supply 34.

In the embodiment shown, the left cable harness 36 runs from the power supply 34 to the left electric motor 20, and the right cable harness 38 extends from the power supply 34 to the right electric motor 22.

The electric motors 20, 22 are therefore connected together solely by means of the power supply 34 by the on-board network 24.

Several consumers 40 of the hybrid vehicle 10 are also connected to the on-board power network 24. Some consumers 40 are connected only to one of the two cable harnesses 36, 38, while other consumers 40 may be connected to both cable harnesses 36, 38.

The cable harnesses 36, 38 may be configured as supply rails with a supply conductor to which the consumers 40 and the electric motors 20, 22 may be connected. The consumers 30 may for example be supplied with electrical power via the supply conductor and at the same time exchange data (Powerline Communication).

The hybrid vehicle 10 also has an on-board accumulator (energy store) 42 which is connected to the on-board power network 24—to both cable harnesses 36, 38 in the embodiment shown—and which serves as an energy accumulator.

To control the electric motors 20, 22 and the consumers 40, a control unit 43 is provided which is formed for example in the power supply 34 and/or as part of the engine control system.

The control unit 43 may control the operation of the electric motors 20, 22 as generators by connecting or disconnecting individual consumers 40. If for example the electric motor 20 must produce a greater braking moment, a consumer 40—which is connected only to the left cable harness 36—is switched on by the control unit 43.

Independently of the on-board power network 24 however, the electric motors 20, 22 may also be coupled together directly.

In the first embodiment according to FIG. 1, the electric motors 20, 22 may be coupled together mechanically for torque transmission by shafts 44, a differential gear mechanism 46 and a clutch 48.

In addition or alternatively, the electric motors 20, 22 may also be able to be connected together electrically by means of direct cabling 50 (indicated in dotted lines in FIG. 1) and a switch 52.

To operate the hybrid vehicle 10, the wheels 12 of the first axle 14 are driven by the internal combustion engine 18.

For driving the hybrid vehicle 10, the internal combustion engine 18 may be supported by the electric motors 20, 22 when the electric motors 20, 22 are operated as motors and thus also drive the wheels 12 of the second axle 16.

In this way, a limited form of all-wheel drive may be achieved. This is helpful for example when starting on a slippery road surface or for hill starts. The electric motors 20, 22 may produce different torques so as to compensate for slip or to create a steering moment in addition to the drive, for example in order to improve acceleration out of a corner.

The electric motors 20, 22 may also be used during travel for recuperation, i.e. energy recovery. For this, the electric motors 20, 22 may be operated individually or simultaneously as generators and hence brake the hybrid vehicle 10. Here, the electric motors 20, 22 produce both a braking moment at the assigned wheels 12 and also electric power, which may e.g. charge the on-board accumulator 42.

Also, the electric motors 20, 22 may be actuated differently on braking, so that different braking moments are produced at the wheels 12 of the second axle 16.

Thus braking interventions of the automatic stability program (DSC, ESP etc.) of the hybrid vehicle 10 may also be carried out.

However, steering maneuvers such as a lane change may also be carried out in this way without cramping the wheels 12 of the first axle 14. The different braking moments at the wheels 12 of the second axle 16 produce a steering moment about the vehicle's vertical axis. In this way, the hybrid vehicle 10 rotates and so performs a steering maneuver.

Both steering and interventions of the stability program require power in conventional hybrid vehicles. In the hybrid vehicle 10 according to the invention, power is now generated in these situations. The surplus energy is stored in the on-board accumulator 42.

The electric motors 20, 22 may also be operated as generators in normal driving, and hence serve to supply power to the consumers 40. Accordingly, the generator 30 of the internal combustion engine 18 need only supply a low power which covers the basic consumption of electrical energy. Accordingly, the generator 30 may be made smaller and cheaper.

Also, the moment fluctuation produced on a shift process during drive by the internal combustion engine may be alleviated or compensated by additional moments of the electric motors 20, 22, whereby driving comfort is improved.

On failure of the on-board power network 24 or parts thereof, the two electric motors 20, 22 may be transferred into an emergency mode. For this, the two electric motors 20, 22 are coupled together, i.e. the clutch 48 and/or the switch 52 are closed.

In the case of a mechanical coupling, the differential gear mechanism 46 may produce different moments at the wheels 12 of the second axle 16, which leads to a torque about the vehicle's vertical axis and hence to a steering moment. The vehicle thus remains maneuverable to a certain extent.

In the case of an electric coupling, a steering moment may be produced if one of the electric motors 20, 22 is operated as a generator and the resulting power is supplied to the second electric motor 22, 20 via the cabling 50. The second electric motor 20, 22 is operated as a motor using the power and drives its assigned wheel 12. Thus a braking moment is applied to one of the wheels 12 of the second axle 16 and a drive moment to the other wheel, whereby a steering moment is produced.

The electric coupling, i.e. the cabling 50, may also partially compensate for failure of the power supply 34 and restore a coupling between the two cable harnesses 36, 38 via the electric motors 20, 22.

In this way, further fall-back levels for emergencies are possible in the hybrid vehicle 10.

Figure 2:
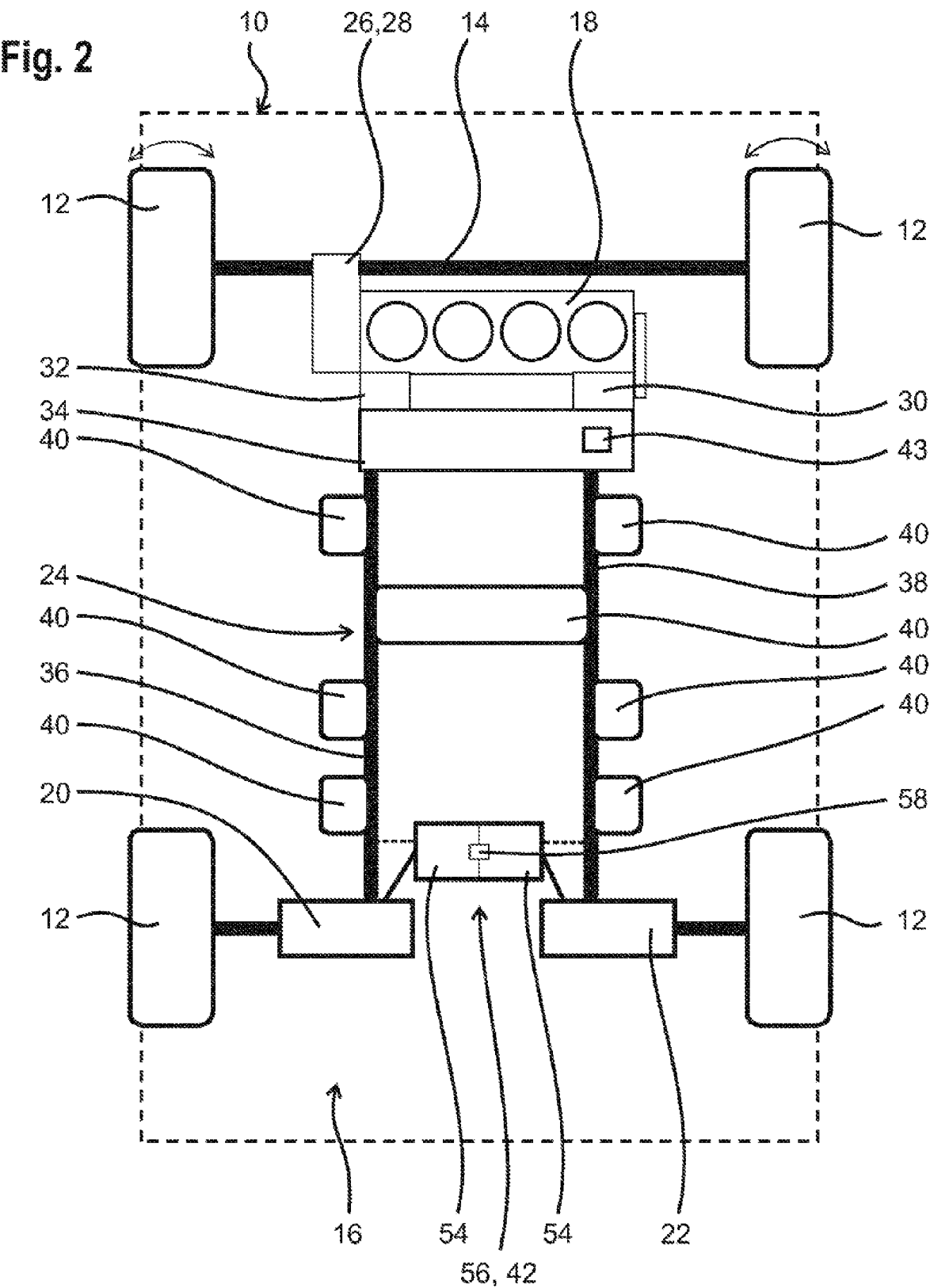
FIG. 2 is schematic diagram of a second embodiment of a hybrid vehicle according to the invention.

FIG. 2 shows a second embodiment of the invention which substantially corresponds to the first embodiment. Therefore only the differences are discussed below, while the same parts and those of equivalent function carry the same reference signs.

The second embodiment differs from the first embodiment in that the coupling between the two electric motors 20, 22 is configured differently.

In the second embodiment, the hybrid vehicle 10 has two electric motor accumulators 54 which may be formed as parts of a divided accumulator 56. For example, the two electric motor accumulators 54 or the divided accumulator 56 form the on-board accumulator 42.

Each of the two electric motor accumulators 54 is connected electrically to a respective electric motor 20, 22, so that each electric motor 20, 22 has its own electric motor accumulator 54.

The two electric motor accumulators 54 may also be connected directly to the respective cable harness 36, 38 of the assigned electric motor 20, 22.

Also, the two electric motor accumulators 54 may be coupled together. For this, either the electric motor accumulators 54 may be coupled together as a whole, or individual cells of the two electric motor accumulators 54 may be coupled together individually or as groups of cells.

Coupling takes place via a switch 58, such as a semiconductor switch or a contactor. If a coupling of the two electric motors 20, 22 is required as described in the first embodiment, the switch 58 is closed. The two electric motor accumulators 54 are thus coupled and serve as a common accumulator for both electric motors 20, 22.

In this way, an electrical connection is achieved between the two electric motors 20, 22 and also between the two cable harnesses 36, 38. This electrical connection resembles the electrical connection via the cabling 50 in the first embodiment.

As will be apparent, the features of the two embodiments may be combined with each other arbitrarily. In particular, in the second embodiment, a mechanical coupling of the electric motors 20, 22 or an electrical coupling of the electric motors 20, 22 via the cabling 50 may also be provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hybrid vehicle, comprising:
an internal combustion engine;
at least two electric motors;
at least four wheels;
a first axle and at least a second axle; and
a control unit,
wherein
two of the wheels are assigned to each axle,
the internal combustion engine is configured for driving the two wheels of the first axle, and
each electric motor is configured to drive a respective one of the two wheels of the second axle, and
the control unit is configured to control the two electric motors such that, for recuperation on steering maneuvers, the one electric motor of the wheel on an inside of a turn is operated as a generator in order to produce a steering moment.

2. The hybrid vehicle as claimed in claim 1, wherein the first axle is a front axle of the hybrid vehicle, and the second axle is a rear axle of the hybrid vehicle.

3. The hybrid vehicle as claimed in claim 1, wherein the first axle is a rear axle of the hybrid vehicle, and the second axle is a front axle of the hybrid vehicle.

4. The hybrid vehicle as claimed in claim 1, further comprising:
an on-board power network and consumers which are electrically connected to the on-board power network, wherein the at least two electric motors are electrically connected to the on-board power network.

5. The hybrid vehicle as claimed in claim 4, wherein the internal combustion engine has a generator which is capable of feeding power into the on-board power network.

6. The hybrid vehicle as claimed in claim 4, wherein the on-board power network has two parallel cable harnesses which each extend from a power supply of the internal combustion engine to a respective one of the two electric motors.

7. The hybrid vehicle as claimed in claim 4, further comprising:
at least one on-board accumulator which is electrically connected to the on-board power network.

8. The hybrid vehicle as claimed in claim 7, wherein two electric motor accumulators are part of a divided accumulator and/or form the at least one on-board accumulator.

9. The hybrid vehicle as claimed in claim 1, wherein the two electric motors are directly coupleable together mechanically, electrically, or mechanically and electrically.

10. The hybrid vehicle as claimed in claim 9, wherein the two electric motors are coupleable together mechanically by a shaft, a clutch and a differential gear mechanism.

11. The hybrid vehicle as claimed in claim 9, wherein the two electric motors are coupleable together by direct cabling using a switch.

12. The hybrid vehicle as claimed in claim 9, further comprising:
at least two electric motor accumulators, each of which is electrically connected to a respective one of the two electric motors, wherein individual cells of the electric motor accumulators, groups of cells or the entire electric motor accumulators are coupleable by a switch.

* * * * *